United States Patent
Burritt et al.

(10) Patent No.: US 6,307,932 B1
(45) Date of Patent: Oct. 23, 2001

(54) END-USER CONTROL OF AUDIO DELIVERY ENDPOINT IN A MULTIMEDIA ENVIRONMENT

(75) Inventors: David R. Burritt; Robert R. Gilman; Gary S. King, all of Broomfield; Albert D. Pessot, Boulder; Farzad Raji, Broomfield, all of CO (US)

(73) Assignee: Avaya Technology Corp, Miami Lakes, FL (US)

( * ) Notice: Subject to any disclaimer, the term of this patent is extended or adjusted under 35 U.S.C. 154(b) by 0 days.

(21) Appl. No.: 09/052,850

(22) Filed: Mar. 31, 1998

(51) Int. Cl.[7] .................................................. H04M 11/00
(52) U.S. Cl. ...................... 379/387; 379/110.01; 379/201
(58) Field of Search .................................... 379/387–389, 379/441, 442, 201, 90.01, 110.01

(56) References Cited

U.S. PATENT DOCUMENTS

| | | | |
|---|---|---|---|
| 5,655,014 | * | 8/1997 | Walsh et al. ........................ 379/201 |
| 5,867,575 | * | 2/1999 | Erickson .............................. 379/399 |
| 5,875,233 | * | 2/1999 | Cox ..................................... 379/442 |

* cited by examiner

*Primary Examiner*—Wing F. Chan
(74) *Attorney, Agent, or Firm*—David Volejnicek

(57) ABSTRACT

In an integrated voice and multimedia communications system (FIG. 1), an end-user is given explicit control over which audio access mechanism he wishes to use regardless of whether a call is a multimedia or a voice call. The end-user's voice terminal (101) is equipped with a PC-Audio control button (127). When the user originates or receives a call, a multimedia PBX (102) automatically connects audio to the voice terminal's handset (124) regardless of whether the call is a multimedia or a voice call. If the user then presses the PC-Audio button, the PBX transfers audio to the audio subsystem (112–114) of the multimedia terminal (100), an LED (128) associated with the button is lit, and the user may cradle the handset without disconnecting the call. If the handset is subsequently lifted, audio is reconnected to the handset and the LED is extinguished. If the button is pressed while its LED is lit, the call is disconnected. If the voice terminal is equipped with a speakerphone (125), interaction thereof with the PC-Audio button mimics a telephone with an integrated speakerphone that is supplemented with an external speakerphone connection.

41 Claims, 3 Drawing Sheets

US 6,307,932 B1

END-USER CONTROL OF AUDIO DELIVERY ENDPOINT IN A MULTIMEDIA ENVIRONMENT

TECHNICAL FIELD

This invention relates to multimedia telecommunications in general, and to end-user terminals for such communications in particular.

BACKGROUND OF THE INVENTION

Multimedia communications systems typically use a personal computer (PC)-based desktop video conferencing system as the end-user's multimedia communications terminal. In the desktop video conferencing system, the audio component of a multimedia call is delivered to and received from the end-user through the audio subsystem of the terminal, which usually comprises a sound card mounted in the PC and speakers and a microphone connected to the sound card.

In an integrated multimedia and voice calling environment, an end-user is typically equipped with both the multimedia terminal and a conventional voice telephone, the former for receipt and/or generation (access) of multimedia calls including the audio component, and the latter for the access of conventional voice-only calls. Having a different audio-delivery and generation mechanism for voice and multimedia calls is confusing, annoying, and inconvenient to end-users.

Some multimedia endpoint vendors, e.g., Picture Tel, have addressed this problem by including a telephone-like PC adjunct in their desktop video conferencing system for delivery of the audio component of a multimedia call. This approach potentially gives the end-user a more familiar device for the receipt of the audio medium. However, the telephone-like adjunct may not actually replace the conventional telephone on the end-user's desktop, in which case the end-user is again left with separate audio delivery mechanisms for voice and multimedia calls.

Lucent Technologies Inc. has addressed this problem in their Video Multimedia Call Center by providing a hardware "y" connection that connects the audio circuitry of both the desktop video conferencing system and the telephone to a single headset. This allows the end-user to access the audio medium of both voice and multimedia calls through the same headset. A headset is the audio instrument of choice in call centers, but not in other environments, e.g., general office environments. Hence, to a large extent, the problem remains unsolved.

SUMMARY OF THE INVENTION

This invention is directed to solving these and other problems and disadvantages of the prior art. Illustratively, the solution involves giving the end-user explicit control, via a new telephone feature button, over which audio access mechanism is to be used at any time. Thus, the end user can select audio access either through the audio subsystem of the multimedia terminal or through the voice telephone regardless of whether the call is a multimedia or a voice call.

Generally, the invention can be used in any communications environment, where the telephone is replaced by any end-user communications terminal, the feature button is replaced by any actuator, the desktop video conferencing system is replaced by any terminal endpoint, and the audio medium is replaced by any one or more media, and calls represent any communications. According to one aspect of the invention, therefore, a method of controlling a call comprises the following steps. An actuator at an end-user terminal is actuated, and in response a first signal (e.g., a notification of the actuation) is sent from the terminal to a call controller. The call controller may be a telephone switch, a LAN server, or any other communications controller that handles (e.g., routes, connects, etc.) communications. In response to receiving the first signal, the call controller disconnects a single medium (e.g., audio) of a multimedia call that is connected to a multimedia endpoint from that endpoint, and connects the single medium of the multimedia call to the terminal. Preferably, the call controller leaves the remainder of the multimedia call connected to the multimedia endpoint.

Correspondingly, an end-user terminal for use with a call controller that handles both single-medium calls and multimedia (including the single medium) calls has an actuator which, when actuated, causes the call controller to disconnect the single medium of a multimedia call that is connected to a multi-media endpoint from that endpoint and connect the single medium to the terminal. And a controller for handling both single-medium calls and multi-media (including the single medium) calls responds to receipt of a first signal (e.g., a notification of the actuation of the terminal's actuator) from an end user terminal while a multi-media call is connected to a multi-media endpoint by disconnecting the single medium of the multi-media call from the endpoint and connecting the single medium to the terminal.

According to a second aspect of the invention, the single medium of any call starts out being connected to the same place, thereby presenting the user with a consistent environment. A method of controlling calls therefore comprises the following steps. Initially, a single medium of single-medium calls as well as of multi-media calls is connected to an end-user terminal, while the rest of the multi-media calls is initially connected to a multi-media endpoint. When an actuator at the terminal is actuated, a first signal is sent in response from the terminal to a call controller. The call controller responds to receipt of the first signal by disconnecting the single medium from the terminal and connecting the single medium to the multi-media endpoint. Then, preferably, if the actuator is actuated again, a second signal is sent to the call controller, and it responds to receipt of the second signal by disconnecting the single medium from the multi-media endpoint while leaving the remainder of any multi-media call connected to the multi-media endpoint, and reconnects the single medium to the terminal.

Correspondingly, an end-user terminal, for use with a call controller that initially connects a single-medium of both single-medium calls and multi-media calls to the terminal and connects the rest of the multi-media calls to a multi-media endpoint, has an actuator which, when actuated, causes the single medium to be disconnected from the terminal and to be connected to the multi-media endpoint. A second actuation preferably causes the single medium of the single-medium and of the multi-media calls to be disconnected from the multi-media endpoint and to be reconnected to the terminal while the remainder of the multi-media calls is left connected to the multi-media endpoint. And a controller for handling both single-medium calls and multi-media (including the single medium) calls initially connects a single medium of both the single-medium and the multi-media calls to an end-user terminal and further connects the rest of the multi-media calls to a multi-media endpoint, but responds to receipt of a first signal from the terminal by disconnecting the single medium from the terminal and connecting it to the multi-media endpoint. Receipt of a second signal from the terminal then preferably causes the call controller to disconnect the single medium of the single-medium and of the multi-media calls from the multi-media endpoint and to reconnect the single medium to the terminal while leaving the rest of the multi-media calls to be connected to the multi-media endpoint.

In its illustrative embodiment form, the selection mechanism designed to operate very much like a traditional speakerphone attached to, or integrated in, a voice telephone, making operation familiar and intuitive to users. When a user originates or receives a call, audio is automatically delivered to the handset regardless of whether the call is voice or multimedia. If the user then presses the new feature button (referred to as the PC-Audio button), audio is transferred to the audio subsystem of the multimedia terminal, an LED associated with the PC-Audio button is lit, and the user may cradle the handset without disconnecting the call. If the handset is subsequently lifted, audio is reconnected to the voice telephone and the LED is extinguished. If the PC-Audio button is pressed while its LED is lit, the call is disconnected. When the PC-Audio button is available in conjunction with a telephone providing a speakerphone option of its own, interaction of the two mechanisms mimics a voice telephone with an integrated speakerphone that is supplemented with an external speakerphone connection.

The benefits of this approach over the prior art are clear. Users are able to take advantage of the alternate single-medium (e.g., audio) access mechanism, or choose not to, regardless of whether a given call is single-medium or a multimedia call. They are not forced to a particular single-medium access mechanism as a function of call type. Furthermore, this flexibility is allowed without requiring special hardware to interconnect the dual single-medium access mechanisms; it is effected by capability integrated into the call controller—its software and its internal switching fabric, in the case of a PBX.

These and other advantages and features of the invention will become more apparent from the following description of an illustrative embodiment of the invention considered together with the drawing.

DETAILED DESCRIPTION

Figure 1:
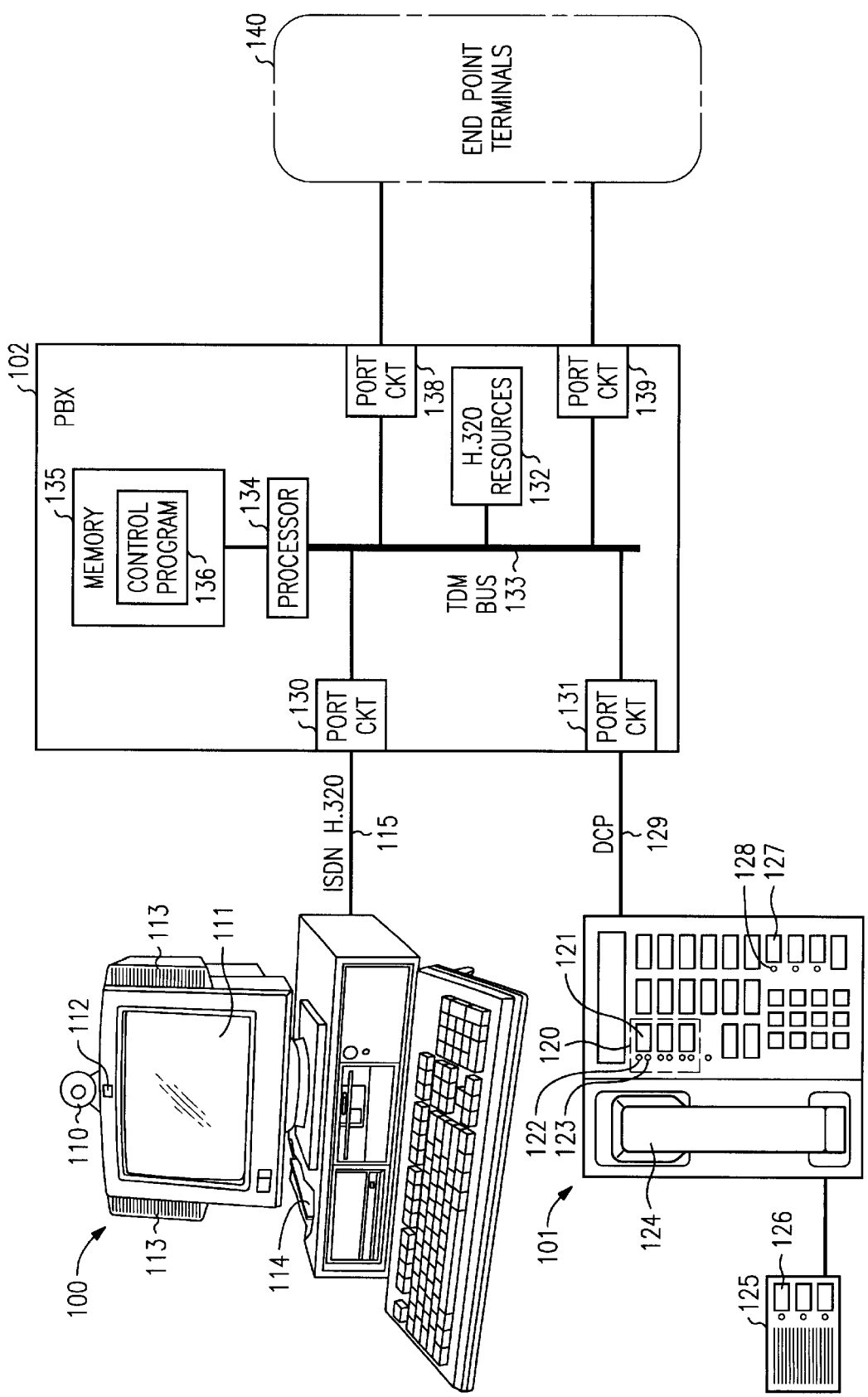
FIG. 1 is a block diagram of a telecommunications system that includes an illustrative embodiment of the invention.

FIG. 1 shows an integrated voice and multimedia communications system comprising a multimedia terminal 100 and a voice terminal 101 connected to a private branch exchange (PBX) 102. Multimedia terminal 100 is conventional, and includes a camera 110, a display 111, a microphone 112, speakers 113, and a sound card 114. Multimedia terminal 100 is connected to PBX 102 by an ISDN H.320-protocol link 115.

Voice terminal 101 is a multi-telephone-line-appearance telephone set. It comprises a plurality of conventional line appearances 120 each consisting of a button 121, a red light (LED) 122, and a green LED 123. It further comprises a telephone handset 124 and a speakerphone 125 with a speakerphone on/off button 126. Voice terminal 101 is connected to PBX 102 by either a DCP protocol link or a hybrid digital-and-analog link 129. Alternatively, link 129 could also be an ISDN BRI link.

ISDN H.320 link 115 terminates in a multimedia port circuit 130 of PBX 102, and DCP link 129 terminates in a DCP port circuit 131 of PBX 102. Port circuits 130 and 131 are interconnected with each other, with port circuits 138–139 that terminate links and trunks leading to other endpoint terminals 140, and with H.320 termination resources 132, by a time-division multiplex (TDM) bus 133 which functions as the switching fabric of PBX 102. PBX 102 is a stored-program-controlled switching system, and as such includes a control processor 134 connected to TDM bus 133 which executes control programs stored in memory 135. In its terminal translations, PBX 102 associates together ports 130 and 131 as corresponding to a single end user, i.e., a single extension number. PBX 102 is illustratively the Definity R6.2 or R6.3 PBX of Lucent Technologies Inc., or the multimedia PBX described in U.S. patent application Ser. No. 08/528,505, filed on Sep. 14, 1995, now allowed and issue fee paid, and assigned to the same assignee as this application, which is hereby incorporated herein by reference.

As described so far, the system of FIG. 1 is conventional. According to the invention, however, voice terminal 101 is equipped with a PC-Audio button 127 and an accompanying green LED 128, and PBX 102 is equipped with a corresponding control program 136 stored in memory 135. PC-Audio button 127 gives the user of terminals 100 and 101 explicit control over which audio access mechanism is to be used at any time. The user can select to access audio either through the audio subsystem 112–114 of terminal 100 or through speakerphone 125 or handset 124 of terminal 101 regardless of whether the call is a multimedia or a voice call.

When a user of terminals 100 and 101 receives or originates a call, PBX 102 connects the audio portion of the call to a default one of the terminals 100 and 101 regardless of whether the call is a multimedia call or a voice call. Illustratively, the default one of the terminals 100 and 101 is identified in the end-user's translations. Preferably, all end users are administered with voice terminal 101 as the default audio terminal.

When a call is established with either terminal 100 or 101, a green LED 123 of an idle call appearance 120 on voice terminal 101 is lit to indicate the presence of the call. Assuming that the call was initiated with audio connected to voice terminal 101, the end user receives and generates audio via handset 124 or speakerphone 125, and PC-Audio green LED 128 remains extinguished.

If the user then presses PC-Audio button 127, audio is transferred to audio subsystem 112–114 of multimedia terminal 101, and PC-Audio green LED 128 is lit. The user may now cradle (return on-hook) handset 124 without disconnecting the call. If handset 124 is subsequently lifted, audio gets reconnected to voice terminal 101 and PC-audio green LED 128 is extinguished.

Figure 2:
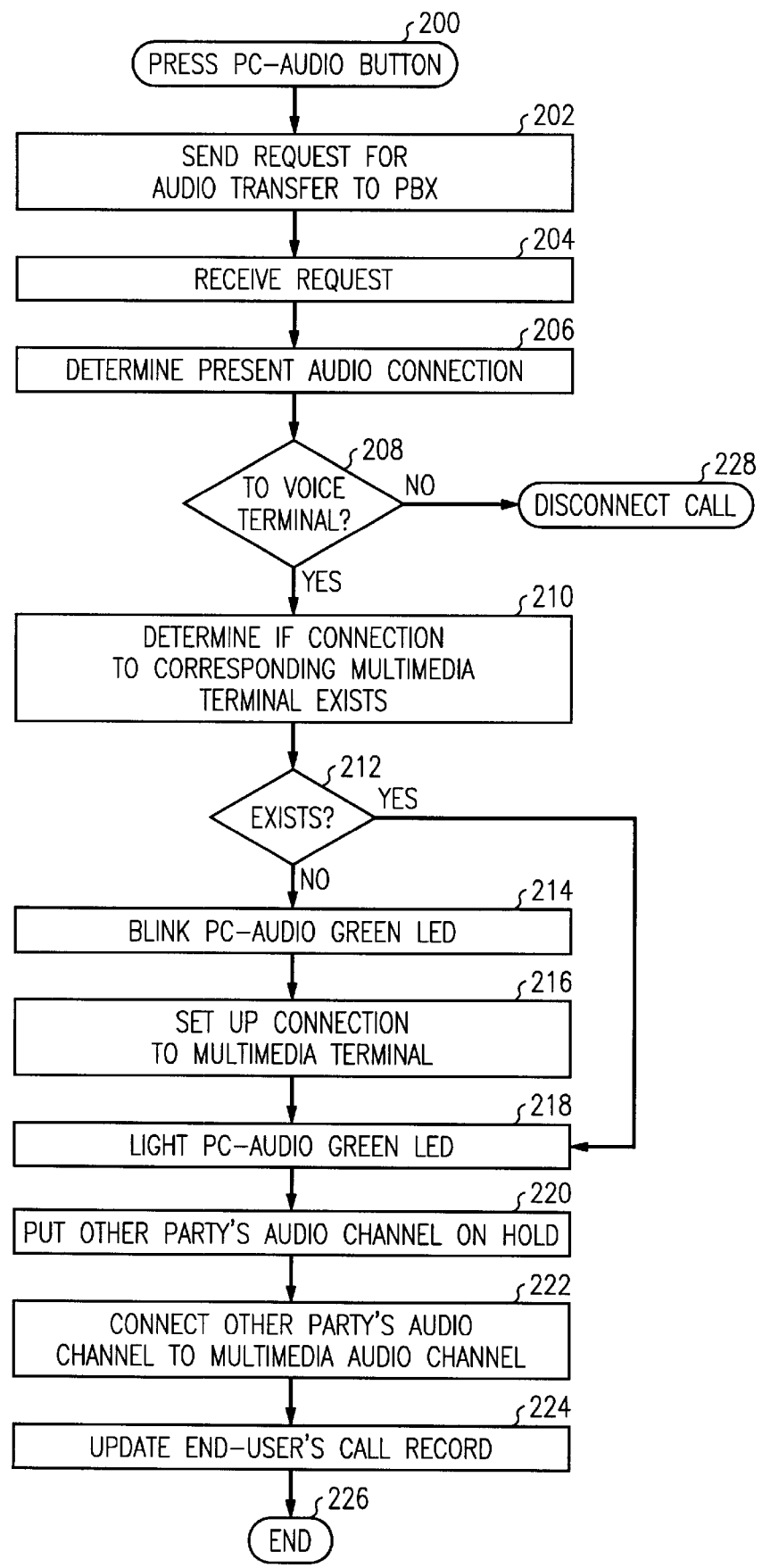
FIG. 2 is a functional flow diagram of functions performed by the system of FIG. 1 in response to the pressing of a PC-Audio control button of the voice terminal of the system of FIG. 1.

The system's response to the end-user pressing PC-Audio button 127 is shown in FIG. 2. When PC-Audio button 127 is pressed, at step 200, terminal 101 sends a request for audio transfer to PBX 102, at step 202. Upon receiving the request, at step 204, processor 134 of PBX 102 executes control program 136 from memory 135. First, processor 104 determines what is the present audio connection to terminals 100 and 101, at step 206. If the audio connection is to multimedia terminal 100, as determined at step 208, the pressing of PC-Audio button 127 is taken as a request to end the call, and so processor 134 proceeds to disconnect the entire call in a conventional manner, at step 228.

Returning to step 208, if the audio connection is to voice terminal 101, processor 104 determines if an H.320 connection to multimedia terminal 100 already exists, at step 210. If it does not exist, as determined at step 212, processor 134 sends a command to voice terminal 101 to cause it to blink PC-Audio green LED 128, at step 214. Processor 134 then sets up an H.320 connection to multimedia terminal 100 with the help of H.320 resources 132, at step 216.

After step 216, or if it was determined at step 210 that an H.320 connection to multimedia terminal already exists, processor 134 sends a command to voice terminal 101 to cause it to light PC-Audio green LED 128, at step 218. Processor 134 now puts the other party's audio channel on hold, at step 220, and connects it to the audio channel of the H.320 connection, at step 222. Processor 134 then updates the end-user's call record to reflect the change in audio connections, at step 224, and ends execution of program 136, at step 226.

Figure 3:
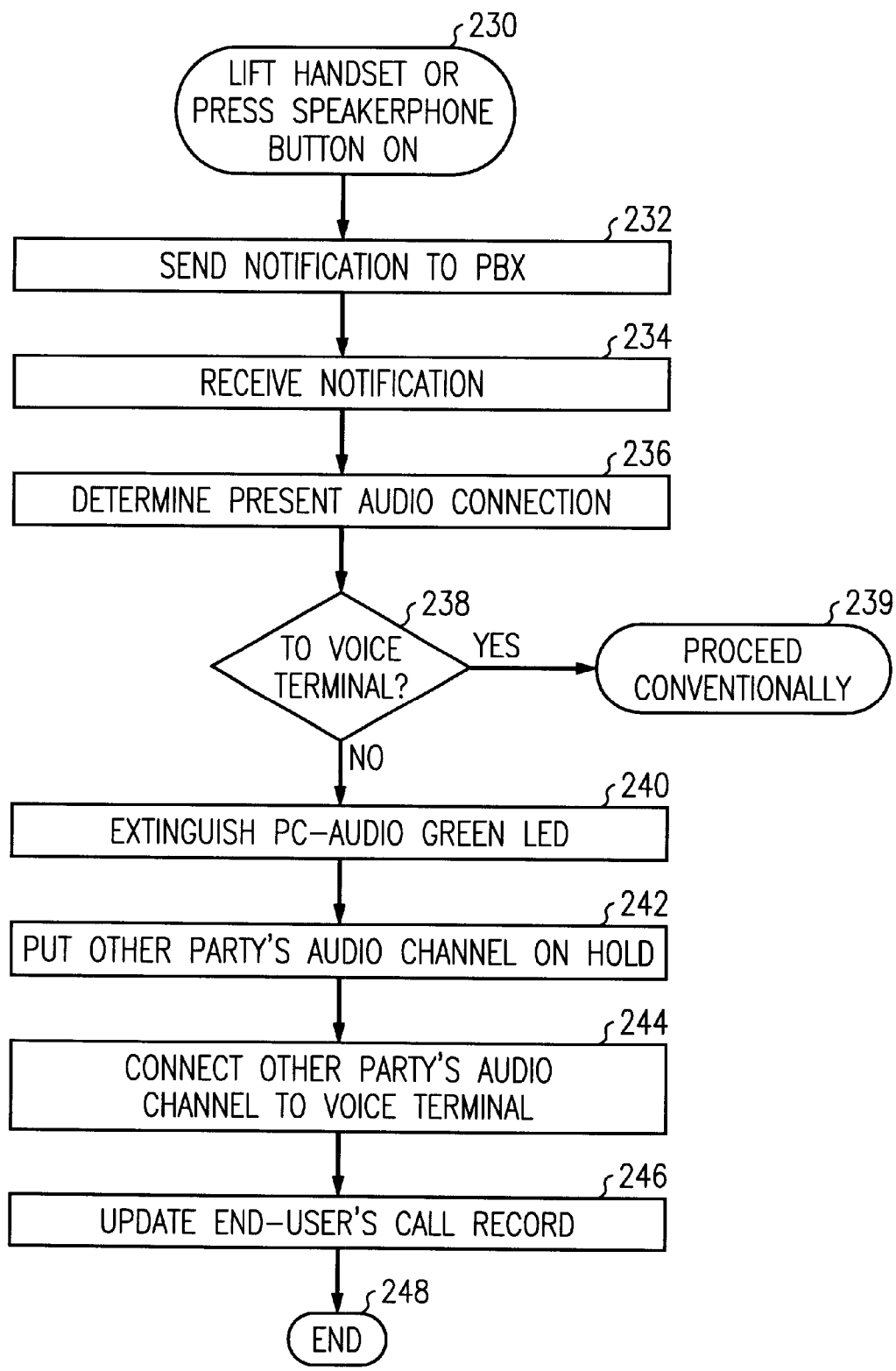
FIG. 3 is a functional flow diagram of functions performed by the system of FIG. 1 in response to the lifting of a handset or the pressing of a speakerphone "on" button of the voice terminal of the system of FIG. 1.

The response of the system of FIG. 1 to the end-user lifting handset 124 or pushing speakerphone button 126 on is shown in FIG. 3. Either action, at step 230, results in notification thereof being sent to PBX 102. When processor 134 receives the notification, at step 134, it determines what is the present audio connection, at step 236. If it is found at step 238 to be to voice terminal 101, processor 134 proceeds conventionally, at step 239. But if it is found to be to multimedia terminal 100, processor 134 executes control program 136 and proceeds to steps 240 et seq.

At step 240, processor 134 extinguishes PC-Audio green LED 128. Processor 134 then puts the other party's audio channel on hold with the help of H.320 resources 132, at step 242, and connects the other party's audio channel to an ISDN BRI channel of terminal 101, at step 244. Processor 134 then updates the end user's call record to reflect the change in audio connections, at step 246, and ends execution of program 136, at step 248.

Of course, various changes and modifications to the illustrative embodiment described above will be apparent to those skilled in the art. For example, music or some other audio visual information may be provided to the user during establishment of an H.320 connection. Such changes and modifications can be made without departing from the spirit and the scope of the invention and without diminishing its attendant advantages. It is therefore intended that such changes and modifications be covered by the following claims.

What is claimed is:

1. An end-user terminal for use with a call controller that handles both single-medium calls and multi-media, including said single medium, calls, the terminal having an actuator which, when actuated, causes the call controller to disconnect the single medium of a multimedia call that is connected to a multi-media endpoint from the multimedia endpoint and to connect the single-medium to the terminal.

2. The terminal of claim 1 wherein:
the actuator is configured for being actuated by an end-user of the terminal.

3. The terminal of claim 1 wherein:
the actuation of the actuator further causes the call controller to leave a remainder of the multi-media call connected to the multi-media endpoint.

4. The terminal of claim 1 wherein:
another actuation of the actuator causes the call controller to disconnect the single medium of the multi-media call from the terminal and to reconnect the single medium to the multi-media endpoint.

5. The terminal of claim 1 wherein:
the terminal is caused to initially connect to any said single-medium call, and first subsequent actuation of the actuator causes the call controller to disconnect said any single-medium call from the terminal and reconnect said any single-medium call to the multi-media endpoint.

6. The terminal of claim 5 wherein:
second subsequent actuation of the actuator causes the call controller to disconnect said any single-medium call from the multi-media endpoint and to reconnect said any single-medium call to the terminal.

7. The terminal of claim 1 wherein:
the terminal is caused to initially connect to the single medium of any said multi-media call while the multi-media endpoint is caused to initially connect to the rest of said any multi-media call, and first subsequent actuation of the actuator causes the call controller to disconnect the single medium from the terminal and connect the single medium to the multi-media endpoint.

8. The terminal of claim 7 wherein:
second subsequent actuation of the actuator causes the call controller to disconnect the single medium from the multi-media endpoint and to reconnect the single medium to the terminal.

9. The terminal of claim 1 further having an indicator, corresponding to the actuator, which is in an on state when the single medium is connected to the multi-media endpoint and which is in an off state when the single medium is connected to the terminal.

10. An end-user terminal for use with a call controller that initially connects a single medium of both single-said-medium calls and multi-media calls to the terminal and further connects remainders of the multi-media calls to a multi-media endpoint, the terminal having an actuator which, when actuated, causes the single medium of the single-medium calls and of the multi-media calls to be disconnected from the terminal and to be connected to the multi-media endpoint.

11. The end-user terminal of claim 10 wherein:
subsequent actuation of the actuator causes the call controller to disconnect the single medium of the single-medium calls and of the multi-media calls from the multi-media endpoint and to reconnect said single medium to the terminal and further leaves the remainders of the multi-media calls connected to the multi-media endpoint.

12. The end-user terminal of claim 10 further having an indicator, corresponding to the actuator, which is in an on state when the single medium is connected to the multimedia endpoint and which is in an off state when the single medium is connected to the terminal.

13. The end-user terminal of claim 10 being a telephone set that has a handset and a pushbutton functioning as the actuator and wherein the single medium is audio.

14. The end-user terminal of claim 13 wherein subsequent actuation of the pushbutton while the handset is off-hook causes the call controller to transfer the audio back from the multi-media endpoint to the telephone set, and the subsequent actuation of the pushbutton while the handset is on-hook causes the call controller to terminate entire said call.

15. The end-user terminal of claim 13 that further has a speakerphone, wherein the subsequent actuation of the pushbutton while the handset is off-hook or the speakerphone is turned on causes the call controller to transfer the audio back from the multi-media endpoint to the telephone set, and the subsequent actuation of the pushbutton while the handset is on-hook and the speakerphone is turned off causes the call controller to terminate entire said call.

16. A call controller for handling both single-medium calls and multi-media, including said single medium, calls, responsive to receipt of a first signal from an end-user terminal while a multi-media call is connected to a multi-media endpoint, for disconnecting the single medium of the multi-media call from the endpoint and connecting the single medium to the terminal.

17. The call controller of claim 16 wherein:
the call controller leaves a remainder of the multi-media call connected to the multi-media endpoint in response to receipt of the first signal.

18. The call controller of claim 16 wherein:
in response to receipt of a second signal from the end-user terminal, the call controller disconnects the single medium of the multimedia call from the terminal and reconnects the single medium to the multi-media endpoint.

19. The call controller of claim 16 wherein:
the call controller initially connects any said single-medium call to the terminal, and in response to subsequent receipt of a second signal from the terminal disconnects said single-medium call from the terminal and connects said single-medium call to the multi-media endpoint.

20. The call controller of claim 19 wherein:
in response to subsequent receipt of a third signal from the terminal, the call controller disconnects said single-medium call from the multi-media endpoint and reconnects said single-medium call to the terminal.

21. The call controller of claim 16 wherein:
the call controller initially connects the single medium of any said multi-media call to the terminal and connects the rest of said multi-media call to the multi-media endpoint, and in response to subsequent receipt of the first signal from the terminal disconnects the single medium from the terminal and connects the single medium to the multi-media endpoint.

22. The call controller of claim 21 wherein:
in response to subsequent receipt of a second signal from the terminal, the call controller disconnects the single medium from the multimedia endpoint and reconnects the single medium to the terminal.

23. The call controller of claim 16 that causes an indicator of the terminal that is associated with the actuator of the terminal to be in an on state when the single medium is connected to the multi-media endpoint, and that causes the indicator to be in an off state when the single medium is connected to the terminal.

24. A call controller for handling both single-medium calls and multi-media, including said single medium, calls, for initially connecting a single medium of both single-said-medium calls and multi-media calls to an end-user terminal and further for connecting remainders of the multimedia calls to a multi-media endpoint, the call controller responsive to receipt of a first signal from the terminal for disconnecting the single medium of the single medium calls and of the multi-media calls from the terminal and connecting the single medium to the multi-media endpoint.

25. The call controller of claim 24 wherein:
in response to receipt of a second signal from the terminal, the call controller disconnects the single medium of the single-medium calls and of the multi-media calls from the multi-media endpoint and reconnects the single medium to the terminal while leaving the remainder of the multimedia calls connected to the multi-media endpoint.

26. The call controller of claim 24 that causes an indicator of the terminal that is associated with the actuator of the terminal to be in an on state when the single medium is connected to the multi-media endpoint, and that causes the indicator to be in an off state when the single medium is connected to the terminal.

27. The call controller of claim 24 for use with the terminal that comprises a telephone set having a handset and a pushbutton, wherein in response to subsequent receipt of a second signal from the telephone set indicative of actuation of the pushbutton, while the handset is off-hook, the call controller transfers the single medium which comprises audio back from the multi-media endpoint to the telephone set, and in response to the receipt of the second signal from the telephone set, while the handset is on-hook, the call controller terminates entire said call.

28. The call controller of claim 27 for use with the terminal that comprises the telephone which further has a speakerphone, wherein in response to the second signal from the telephone set, while the handset is off-hook or the speakerphone is turned on, the call controller transfers the audio back from the multi-media endpoint to the telephone set, and in response to the second signal from the telephone set, while the handset is on-hook or the speakerphone is turned off, the call controller terminates entire said call.

29. A method of controlling a call, comprising the steps of:
actuating an actuator at an end-user terminal;
in response, sending a first signal from the terminal to a call controller that handles both single-medium and multi-media, including said single medium, calls;
in response to receiving the first signal, the call controller disconnecting the single medium, of a multi-said-media call that is connected to a multi-media endpoint, from the multi-media endpoint; and
further in response to receiving the first signal, the call controller connecting the single medium of the multi-media call to the terminal.

30. The method of claim 29 wherein the step of actuating comprises the step of a user pressing a button of a telephone set.

31. The method of claim 29 further comprising the step of:
further in response to receiving the first signal, the call controller leaving a remainder of the multi-media call connected to the multi-media endpoint.

32. The method of claim 29 further comprising the steps of:
actuating again the actuator;
in response, sending a second signal from the terminal to the call controller;
in response to receiving the third signal, the call controller disconnecting the single medium of the multi-media call from the terminal; and
further in response to receiving the second signal, the call controller reconnecting the single medium to the multi-media endpoint.

33. The method of claim 29 further comprising the steps of:

initially connecting the terminal to any single-said-medium call;

subsequently actuating the actuator;

in response, sending a second signal from the terminal to the call controller;

in response to receiving the second signal, the call controller disconnecting said single-medium call from the terminal; and further in response to receiving the second signal, the call controller connecting said single-medium call to the multi-media endpoint.

34. The method of claim 33 further comprising the steps of:

subsequently actuating again the actuator;

in response, sending a third signal from the terminal to the call controller;

in response to receiving the third signal, the call controller disconnecting said single-medium call from the multi-media endpoint; and further in response to receiving the third signal, the call controller reconnecting said single-medium call to the terminal.

35. The method of claim 29 wherein the step of actuating the actuator is preceded by the steps of:

initially connecting the single medium of any said multi-media call to the terminal;

connecting a remainder of said multi-media call to the multimedia endpoint;

initially actuating the actuator;

in response, sending a second signal from the terminal to the call controller;

in response to receiving the second signal, the call controller disconnecting the single medium from the terminal; and further in response to receiving the second signal, the call controller connecting the single medium to the multi-media endpoint.

36. The method of claim 29 further comprising the steps of:

in response to connecting the single medium to the multi-media endpoint, the call controller causing an indicator of the terminal that is associated with the actuator to assume an on state; and in response to connecting the single medium to the terminal, the call controller causing the indicator to assume an off state.

37. A method of controlling calls, comprising the steps of:

initially connecting a single medium of single-said-medium calls and of multi-media, including said medium, calls to an end-user terminal;

initially connecting a remainder of the multi-media calls to a multi-media endpoint;

actuating an actuator at the terminal;

in response, sending a first signal from the terminal to a call controller;

in response to receiving the first signal, the call controller disconnecting the single medium from the terminal; and further in response to receiving the first signal, the call controller connecting the single medium to the multi-media endpoint.

38. The method of claim 37 further comprising the steps of:

actuating again the actuator;

in response, sending a second signal from the terminal to the call controller;

in response to receiving the second signal, the call controller disconnecting the single medium from the multi-media endpoint while leaving the remainder of the multi-media calls connected to the multimedia endpoint; and further in response to receiving the second signal, the call controller reconnecting the single medium to the terminal.

39. The method of claim 37 further comprising the steps of:

in response to connecting the single medium to the multi-media endpoint, the call controller causing an indicator of the terminal that is associated with the actuator to assume an on state; and in response to connecting the single medium to the terminal, the call controller causing the indicator to assume an off state.

40. The method of claim 37 wherein the step of actuating the actuator comprises the step of pressing a pushbutton of a telephone set having a handset, the method further comprising the steps of:

pushing again the pushbutton of the telephone set;

in response, sending a second signal from the telephone set to the call controller, in response to both receiving the second signal and the handset of the telephone set being off-hook, the controller transferring audio, which comprises the single medium, back from the multi-media endpoint to the telephone set; and in response to both receiving the second signal and the handset of the telephone set being on-hook, the controller terminating entire said call.

41. The method of claim 37 wherein the step of actuating the actuator comprises the step of pressing a pushbutton of a telephone set having a handset and a speakerphone, the method further comprising the steps of:

pushing again the pushbutton of the telephone set;

in response, sending a second signal from the telephone set to the call controller;

in response to both receiving the second signal and either the handset of the telephone set being off-hook or the speakerphone being turned on, the controller transferring audio, which comprises the single medium, back from the multi-media endpoint to the telephone set; and in response to both receiving the second signal, the handset of the telephone set being on-hook, and the speakerphone being turned off, the controller terminating entire said call.

* * * * *